United States Patent [19]
Blouin et al.

[11] Patent Number: 5,680,212
[45] Date of Patent: Oct. 21, 1997

[54] SENSITIVE AND FAST RESPONSE OPTICAL DETECTION OF TRANSIENT MOTION FROM A SCATTERING SURFACE BY TWO-WAVE MIXING

[75] Inventors: Alain Blouin, Montréal, Canada; Philippe Delaye, Paris, France; Denis Drolet; Jean-Pierre Monchalin, both of Montréal, Canada; Gérald Roosen, La Celle-les-Bordes, France

[73] Assignee: National Research Council of Canada, Ottawa, Canada

[21] Appl. No.: 632,073

[22] Filed: Apr. 15, 1996

[51] Int. Cl.[6] .................................... G01B 9/02
[52] U.S. Cl. ...................... 356/357; 356/347; 73/656
[58] Field of Search ............................ 356/357, 358, 356/432, 349, 351, 347, 348; 73/656, 657

[56] References Cited

U.S. PATENT DOCUMENTS 5,131,748  7/1992  Monchalin et al. ................. 356/358

OTHER PUBLICATIONS

R.K. Ing. J.P. Monchalin, Broadband Detection of Ultrasound by Two–Wave Mixing in a Photorefractive Crystal, Appl. Phys. Lett. 59, 3233 Sep. 1991.
A. Blouin, J.P. Monchalin, Detection of Ultrasonic Motion of a Scattering Surface by Two–Wave Mixing in a Photorefractive GaAs Crystal, Appl. Phys. Lett., 65, 932–934 Aug. 1994.
P. Delaye, L.A. de Montmorillon, G. Roosen, Transmission of time modulated optical signals through an absorbing photorefractive crystal, Optics Communications, 118, 154 Jul. 1995.
F.M. Davidson, C.T. Field, Coherent Homodyne Optical Communication Receivers with Photorefractive Optical Beam Combiners, J. Lightwave Technol. 12, 1207 Jul. 1994.
Y.O. Barmenko, V.V. Zosimov, N.M. Kozhevnikov, L.M. Lyamshev, S.A. Sergushchenko, Investigation of Small Ultrasonic Vibrations by Optical Dynamic Holography Techniques, Sov. Phys. Dokl., 31, 817 Oct. 1986.
T. Honda, T. Yamashita, H. Matsumoto, Optical Measurement Ultrasonic Nanometer Motion of Rough Surface by Two–Wave Mixing in Bi 12 SiO 20 Jpn. J. Appl. Phys. 34, 3737, Jul. 1995.
T. Chang, A. Chiou, P. Yeh, Cross–Polarization Photorefractive Two–Beam Coupling in Gallium Arsenide, J. Opt. Soc Am B, 5, 1724 Aug. 1988.

(List continued on next page.)

*Primary Examiner*—Samuel A. Turner
*Attorney, Agent, or Firm*—Neil Teitelbaum & Associates

[57] ABSTRACT

A method and apparatus are provided of optically detecting transient motion from the surface of a workpiece. After directing a laser beam onto a surface of a workpiece the beam is reflected from it and then interferes with a pump beam removed from the laser source, inside a real-time holographic material, so as to form a grating diffracting the pump beam into a reference beam, which interferes at the output of the real-time holographic material with the received light beam, so as to produce a signal representative of the surface transient motion. An electric field is applied to the holographic material of sufficient magnitude to increase substantially the intensity of said reference beam and to give to this beam a phase differing substantially from the phase of said received light beam. The electric field is applied prior to the transient motion to be detected, for a time interval sufficiently long so as to capture the transient motion but sufficiently short a duration so as to avoid excessive heating of the real-time holographic material. The pump beam is of sufficiently high intensity so as to cause the response time of the real-time holographic material to be substantially shorter than a characteristic time defined as the time during which the phase of the received light, on average across its spatial distribution or locally, is not substantially changed.

23 Claims, 4 Drawing Sheets

OTHER PUBLICATIONS

C.T. Field, F.M. Davidson, Photorefractive Two–Wave Mixing in the Present of High–Speed Optical Phase Modulation, Appl. Opt. 32, 5285 Sep. 1993.

G. Hamel de Monchenault, J.P. Huignard, Two–Wave Mixing with Time–Modulated Signal in Bi 12 SiO 20 Theory and Application to Homodyne Wave–Front Detection, J. Appl. Phys. 63, 624 Feb. 1988.

F.M. Davidson, L. Boutsikaris, Homodyne Detection Using Photorefractive Materials as Beamsplitters, Opt. Eng. 29, 369 Apr. 1990.

SENSITIVE AND FAST RESPONSE OPTICAL DETECTION OF TRANSIENT MOTION FROM A SCATTERING SURFACE BY TWO-WAVE MIXING

FIELD OF THE INVENTION

The invention generally relates to a method and apparatus for optically detecting transient motion from a scattering surface. More particularly, the invention relates toward detecting optical phase modulations such as those produced by ultrasound.

BACKGROUND OF THE INVENTION

The detection of phase modulation or frequency modulation of an optical wave is important for various fields of application where optical beams are used to detect the motion of objects. This is the case of laser sensing of vibrations and laser detection of ultrasound and of transient body deformations such as those produced by a shock or impact. Of particular interest for practical applications is the case where ultrasound or a shock wave is generated by a laser. In this case, a completely remote ultrasonic inspection system can be realized, permitting for example ultrasonic probing at elevated temperatures. A technique based on laser generation and optical detection can thus be advantageously used to inspect materials at high temperatures (such as all metals and ceramics) for process and quality control, to detect flaws as soon as they are created during processing, to measure production parameters such as thickness, temperature, etc. and to determine microstructural properties on-line (grain size, porosity, etc.) This technique is also particularly advantageous to inspect parts of complex shapes such as those made of polymer matrix composite materials and used in advanced aeronautic and aerospace structures.

In all cases of practical interest, ultrasonic excitation of an object produces at its surface, very small displacements that translate into correspondingly very small phase or frequency perturbations. Therefore, a sensitive detection technique has to be used, which means in practice a technique based on optical interferometry. Since in practice, the probed surfaces are rough, the ultrasonic information is encoded into an optical beam with speckle and a suitable interferometric technique should integrate effectively over the whole speckle field or provide demodulation independently of the speckle nature of the collected light beam. In various U.S. patents, one of the applicants, Jean-Pierre Monchalin, has described interferometric schemes for sensitive detection in these conditions. All of these schemes are characterized by their large étendue parameter.

This étendue parameter (or throughput), is defined as the product of its effective entrance aperture area by the solid angle limited by the rays of maximum inclination passing through the entrance aperture center and thus defining the field of view. The maximum inclination rays can be defined as those which produce a shift of the interference pattern by a quarter of a fringe. The importance of the étendue parameter stems from its invariance within the frame of geometric optics. A large étendue permits to choose light collecting optics of large size, being only limited by cost and practical feasibility, and to detect surface motion over a large area.

In an arrangement described by one of the applicants, Jean-Pierre Monchalin, in U.S. Pat. No. 4,659,224 issued Apr. 21, 1987, entitled Optical Interferometric Reception of Ultrasonic Energy, a confocal Fabry-Perot is used in transmission to provide a signal representative of the surface motion independently of the speckle effect. In U.S. Pat. No. 4,966,459 issued Oct. 30, 1990, entitled Broadband Optical Detection of Transient Surface Motion From a Scattering Surface, the applicant describes the use of the same type of interferometer, that may be used within a Mach-Zehnder interferometric arrangement or in a reflection scheme to provide the same capability with a very broad detection bandwidth. These two patents describe passive detection schemes. It is also possible by using nonlinear optical techniques to actively correct the phase distortion produced by the speckle or to generate a reference wave whose phase distribution matches the scattered beam from the surface.

Such an active scheme for the detection of surface transient motion or ultrasound, more precisely based on the use of two-wave mixing in a photorefractive crystal, is described by one of the applicant, Jean-Pierre Monchalin, and R. K. Ing in U.S. Pat. No. 5,131,748 issued Jul. 21, 1992, entitled "Broadband Optical Detection of Transient Motion from a Scattering Surface". Photorefractive crystals are holographic optical materials in which the light grating produced by the interference of the signal wave (having the phase change given by the surface motion) with a pump wave directly derived from the laser gives rise to a space charge grating, following the motion of free charges within the material. This space charge grating gives in turn rise by the electrooptic effect to an index of refraction grating. This grating, which is quasi-stationary during the surface motion, diffracts the pump beam directly derived from the laser to produce a wave propagating in the direction of the signal beam, with a wavefront matched to it. Therefore, this two-wave mixing scheme could also be viewed as real-time holography, the reading of the hologram created inside the material being performed simultaneously to its writing. The diffracted wave acts as the reference beam of an interferometer and its interference with the transmitted signal beam provides an intensity modulated signal representative of the transient phase variation produced by the workpiece surface motion. This principle can also be applied in real-time holographic materials in which gratings that are not index of refraction gratings, such as absorption gratings, are produced. It can also be applied in amorphous materials such as photorefractive polymers.

As described in U.S. Pat. No. 5,131,748 mentioned above, optimum sensitivity requires the transmitted signal wave and the diffracted wave (reference beam) to be in quadrature (phase shift=$\pi/2+n\pi$). When these waves are in phase or in opposition of phase (phase shift=$0+n\pi$, n being an integer), the signal is practically zero. This case occurs in photorefractive materials where charge motion is caused by diffusion and U.S. Pat. No. 5,131,748 mentioned above provides in particular various solutions applicable to this case.

Two-wave mixing in a real-time holographic material or photorefractive crystal is an attractive approach to perform the detection of transient surface motion, which provides in particular a more compact system than the ones based on the Fabry-Perot interferometer. Two-wave mixing allows also a broader detection bandwidth than the Fabry-Perot based systems, especially including the low ultrasonic frequency range, from several kHz to about 1 MHz. There are however several limitations. Although the formation and erasure of the photorefractive grating have to be sufficiently slow for satisfactory operation of the device, they are often much too slow for adequate adaptation to variations of the speckle pattern. This is the case of many applications where the probed surface is affected by vibrations or is moving or when the inspected location is changed. In this case, it is possible to define a characteristic time during which the phase of the collected scattered light, either on average across the speckle pattern or locally, is not significantly changed. The acceptable change may be for example π/10. Another reason for rapid adaptation of the photorefractive grating is the use of a pulsed laser, which provides, since it is pulsed, a higher amount of light collected from the surface and consequently a better sensitivity. Two of the applicants, Alain Blouin and J. -P. Monchalin, have reported the use of semiconductor crystals, which provide a more rapid response time by their relatively high conductivity, in Applied Physics Letters, vol. 65, pp. 932–934 (title of the communication: "Detection of ultrasonic motion of a scattering surface by two-wave mixing in a photorefractive GaAs crystal"). However, although the response time demonstrated is relatively short, the sensitivity is not optimum. This lack of sensitivity can be traced to the relative weakness of the beam diffracted by the photorefractive grating. It is known that this beam could be increased by applying an electric field. Ultimately, one would like to have a diffracted beam (reference beam) much more intense than the incident signal beam to reach the limit of optimum signal-to-noise ratio. The application of an electric field has the effect of not only increasing the amplitude of the diffracted beam, but also of shifting the index of refraction grating with respect to the interference grating, so the transmitted signal wave and the diffracted reference wave are not in phase. With a sufficient applied field, it is possible to get close to the optimum condition of quadrature. Note also that the application of an electric field tends also to lengthen the response time. Furthermore, this principle has been applied to the detection of ultrasound using a BSO crystal and that the work was reported in Japanese Journal of Applied Physics, vol. 34, pp. 3737–3740, 1995, title: "Optical measurement of ultrasonic nanometer motion of rough surface by two-wave mixing in BSO", authors: Tokuyuki Honda, Toshihisa Yamashita and Hirokazu Matsumoto.

It turns out that the application of an electric field of a magnitude sufficient to increase appreciably sensitivity, while keeping an adequate response time presents several difficulties. This approach was found to be inapplicable to GaAs and difficult to apply on other fast photorefractive materials including, BSO and semiconductors for a number of reasons. First, the high electric field which has to be applied could cause electrical breakdown at the surface of the crystal or within the crystal. Second, the strong illumination which is required to get the desired short time constant decreases the electrical resistance, leading to high electric current and in turn, as a consequence, to high thermal loading and possible catastrophic breakdown. It is an object of this invention to seek to overcome these limitations by providing a method and apparatus for the detection at a distance of surface transient motions and ultrasonic motions, which is both very sensitive and fast response.

SUMMARY OF THE INVENTION

In accordance with the invention there is provided, a method of optically detecting transient motion from the surface of a workpiece having a predetermined duration, comprising the steps of:

a) directing a beam generated by a laser onto said surface;

b) receiving a light beam that has been reflected or scattered by said surface;

c) allowing the received light beam to interfere with a pump beam removed from the laser, inside a real-time holographic material, so as to form a grating diffracting the pump beam into a reference beam, which interferes at the output of the real-time holographic material with the received light beam, so as to produce a signal representative of the surface transient motion;

d) applying onto said real-time holographic material, an electric field of sufficient magnitude to increase substantially the intensity of said reference beam and to give to this beam a phase differing substantially from the phase of said received light beam, wherein the step of applying the electric field is performed prior to the transient motion to be detected, for a time interval sufficiently long to capture the transient motion but sufficiently short to avoid excessive heating of the real-time holographic material; wherein said pump beam being of sufficiently high intensity to cause the response time of the real-time holographic material to be substantially shorter than a characteristic time defined as the time during which the phase of the received light, on average across its spatial distribution or locally, is not substantially changed; and, e) inducing surface transient motion at a predetermined time after electric field application onto the real-time holographic material, and wherein the pump beam intensity, applied field amplitude and applied field duration are such to avoid real-time holographic material catastrophic failure.

In accordance with another aspect of the invention there is provided, an apparatus for optically detecting transient motion from the surface of a workpiece having a predetermined duration, which comprises:

a) means for inducing said transient motion;

b) means for generating and directing a laser beam onto said surface;

c) means for receiving light reflected or scattered by said surface and phase modulated by its transient motion;

e) real-time holographic material element provided with electrodes and arranged to collect received light beam;

f) means for removing directly from the laser beam a pump beam of sufficiently high intensity to cause the response time of the real-time holographic material element to be substantially shorter than a characteristic time defined as the time during which the phase of the received light, on average across its spatial distribution or locally, is not substantially changed;

g) means for causing the received light beam to interfere inside the real-time holographic material element with said pump beam, so as to form a grating diffracting said pump beam into a reference beam, which interferes at the output of the real-time holographic material with the transmitted received light beam, so as to produce finally a signal representative of the surface transient motion;

h) means for applying onto said real-time holographic material element electrodes a pulsed electrical voltage of sufficient magnitude to increase substantially said reference beam intensity with a phase also differing substantially from the phase of said transmitted received light beam;

i) means for timing the triggering of the excitation of the transient motion and the application of the electrical voltage, the voltage being turned on before the triggering of said means for inducing transient motion and turned off after end of transient motion, while keeping turn-on duration minimum to avoid heating of the real-time holographic material.

BRIEF DESCRIPTION OF THE DRAWINGS

Exemplary embodiments of the invention will now be described in conjunction with the drawings, in which.

DETAILED DESCRIPTION

Figure 1:
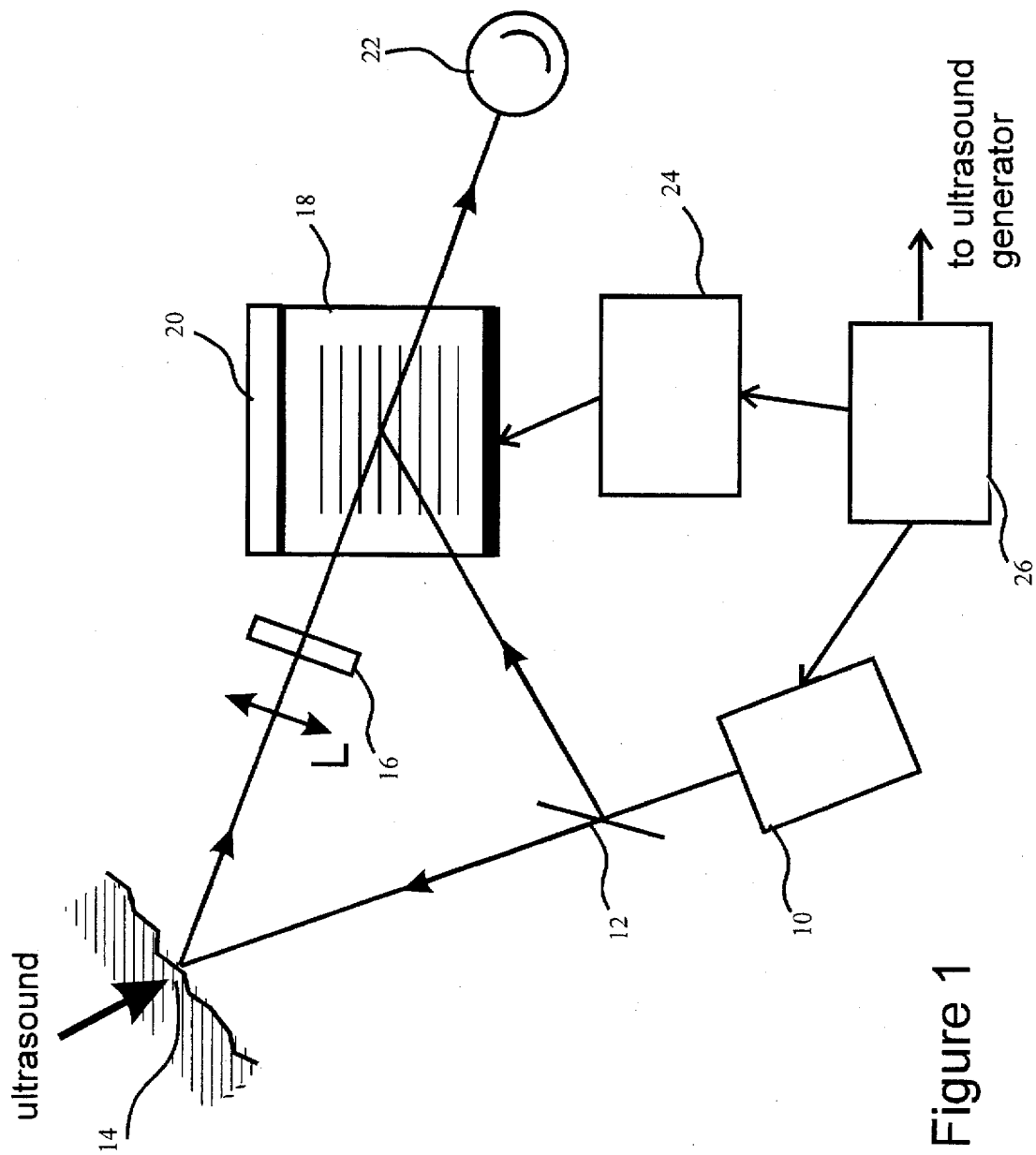
FIG. 1 is a schematic illustration of a first embodiment of an apparatus for optically detecting transient motion from the surface of a workpiece.

FIG. 1 illustrates a first embodiment according to the invention. As seen in FIG. 1, a laser 10 is used to illuminate the workpiece 14 whose surface is in transient motion, for example, excited by ultrasound. Part of the laser light scattered or reflected by the surface of the workpiece is collected by a lens system L and then projected onto a real-time holographic material, preferably in the form of a photorefractive crystal 18. A fraction of the laser beam is removed at the output of the laser (pump beam) by a beam splitter 12 and is sent onto the real-time holographic material element 18 where it interferes with the beam collected from the surface (signal beam) to produce an interference grating and then an index of refraction grating or absorption grating, from which a reference wave is produced, as explained above. This reference wave produces by interference with the transmitted signal wave an intensity modulated signal representative of the surface motion, which finally appears on a photodetector 22 at the output of the real-time holographic material element 18.

An electric field is set throughout the real-time holographic material or crystal by applying a voltage on two electrodes located on two opposite faces. As mentioned above, the application of a strong field with the requirement of a short response time causes difficulties. The applicants found an arrangement which is satisfactory from the point of view of both sensitivity and response time by the combination of essentially three features, which are outlined in FIG. 1.

First, the voltage is applied only during the time necessary for the detection of the surface transient or ultrasonic motion. As shown in FIG. 1, electronic circuitry 26 is used to generate a clock signal and to command the turn-on and turn-off of the high voltage source 24 (typically several kV), whose output is connected to electrodes on the real-time holographic material element or crystal 18. Typically a turn-on interval of about 100 µs is used and is sufficient to capture the ultrasonic signal of interest. This clock and trigger electronics 26 is also used to trigger the ultrasonic generation device after the turn-on of the high voltage source. The ultrasonic generation device is usually in cases of practical interest a laser, but others means such as piezoelectric devices could be used as well.

Second, a fast real-time holographic element 18 is used. This element 18 can be in the form of a crystal of the sillenite type such as BSO, BGO or BTO or preferably, a semiconductor photorefractive crystal. A crystal such as Indium Phosphide (InP) with iron doping and Cadmium Telluride (CdTe) with vanadium doping was found to be suitable. The length of the real-time holographic element or crystal 18 was chosen in such a way as to obtain an optimum sensitivity for a maximum acceptable applied voltage.

Third, sufficient pump beam illumination is applied to the real-time holographic element to increase its photoconductivity and to decrease its response time. In some case where the workpiece 14 is stationary and not affected by strong vibrations the use of a continuous laser may be adequate. Otherwise a pulse system is used to provide a much higher intensity. In this case, this laser system is triggered by the clock and trigger electronics 26 after the turn-on of the applied voltage and before the ultrasound generation source. In many cases of practical interest where a response time between 1 to 10 µs is required, several hundred watts are sent onto the real-time holographic element providing illumination in the range of 1 kW/cm$^2$.

As noted in FIG. 1, the real-time holographic element 18 is mounted on a thermoelectric cooler 20 to avoid any temperature run-off or is, alternatively, properly heat-sunk. As shown in FIG. 1, a polarizer 16 may be added on the signal beam path to select the same polarization as that of the pump beam, which is usually polarized. Nevertheless, interference occurs only between beams of the same polarization. The polarizer 16 removes light which is not useful and will be collected by the detector, thus adding noise. Such polarizer will be added in particular when light is collected from the workpiece 14 and then transmitted to the real-time holographic element using a large core multimode fiber (not represented in FIG. 1). In this case, there is near complete depolarization after propagation through the fiber. For cubic photorefractive crystals such as InP and CdTe, a suitable arrangement is the following: the crystal is cut along the [001], [−110] and [110] faces, the input face is [−110], the signal and pump beams propagate in the [110] plane, are both polarized along the [110] direction, the space charge field and the applied field are both along the [001] direction (the electrodes are on the [001] faces).

Figure 2:
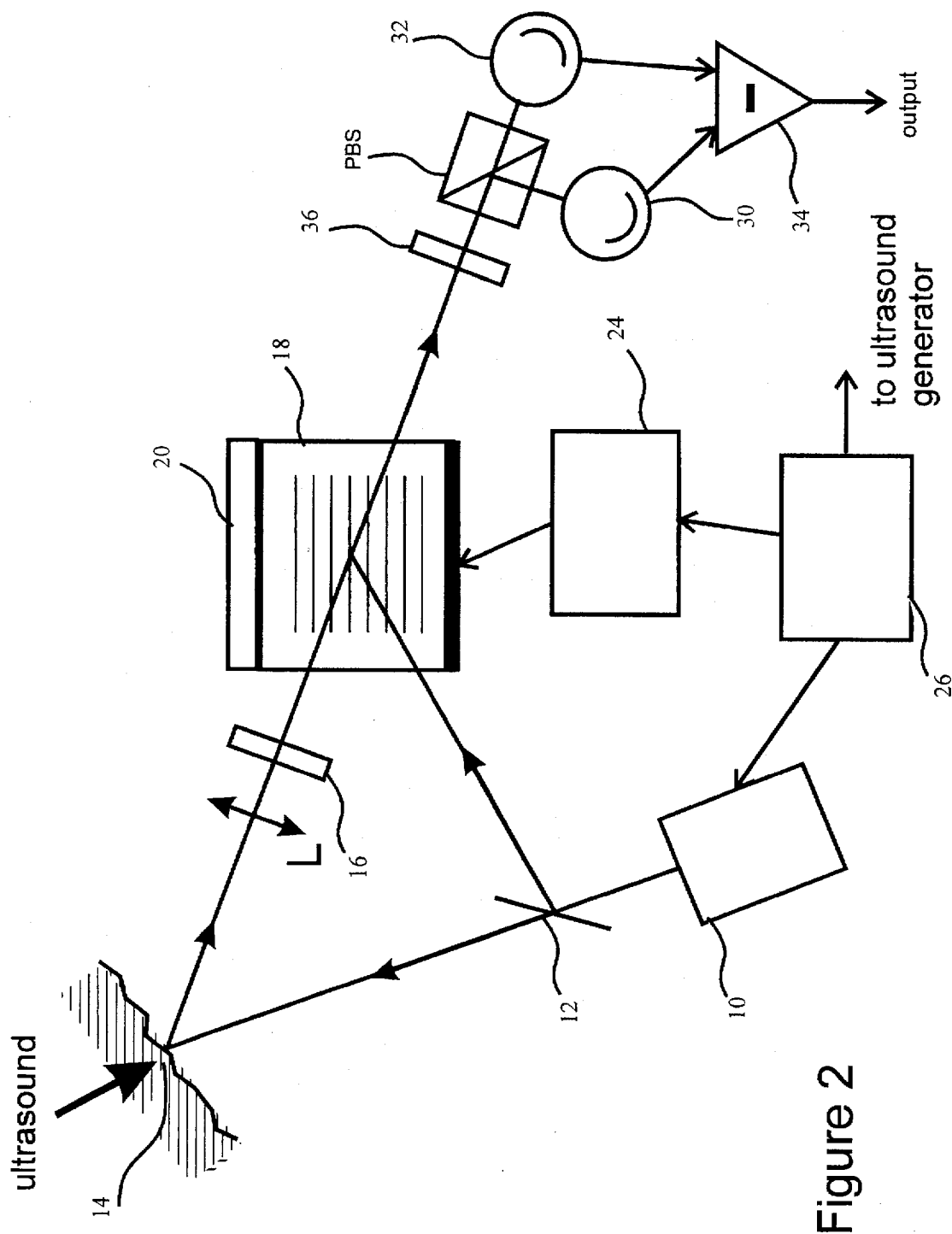
FIG. 2 is a schematic illustration of a second embodiment of an apparatus for optically detecting transient motion from the surface of a workpiece which includes a differential detection scheme.

FIG. 2 illustrates a second embodiment according to the invention. In this embodiment the real-time holographic element 18 again preferably in the form of but not limited to a photorefractive crystal is used in a configuration such that the pump beam is diffracted with a polarization perpendicular to the transmitted signal beam (anisotropic diffraction). This occurs in particular in cubic crystals such as InP and CdTe with the following arrangement: the crystal has the same cut as before (along the [001], [−110] and [110] faces) and the input face is [−110], as is previously described, the signal and pump beams propagate in the [001] plane and are both polarized along the [001] direction, the space charge field and the applied field are both along the [110] direction (the electrodes are on the [110] faces). The polarization direction at the output of the laser 10 and given by the polarizer ahead of the crystal 16 is assumed to be perpendicular to the plane of the drawing. As shown in FIG. 2, the diffracted pump beam (reference beam) and the transmitted signal beam are made to interfere along the two polarizations directions of a polarizing beam splitter PBS oriented at 45° to the plane of the drawing. The optical signals along the two polarizations of the polarizing beam splitter PBS are collected by two detectors 30 and 32 whose outputs are sent to a differential amplifier 34. Since the varying parts of these two signals have opposite signs, this configuration allows to increase the sensitivity with respect to the case where only one detector would be used.

This embodiment is particularly useful when the high repetition rate of the laser combined with high intensity pump beam necessary to get a very short response time limits the applied electric field, so the optimum sensitivity cannot be reached with a crystal 18 of reasonable length in the case of the first embodiment. In the second embodiment, although the proper phase shift between the transmitted signal beam and the reference beam is not directly obtained at the output of the real-time holographic element or photorefractive crystal 18, the phase shift can be properly set by the adjustable wave plate 36 shown in FIG. 2. The additional phase shift given by the wave plate is varied in order to maximize the signal representative of the surface motion. Plate neutral axes are in the plane of the drawing and perpendicular to it. A suitable adjustable wave plate 36 is a Babinet-Soleil compensator. Other features of this embodiment are the same as the previous one.

This embodiment is also useful to minimize the background signal level by its differential configuration and consequently minimizes the effect of laser intensity fluctuations. These intensity fluctuations may fall within the detection bandwidth and may add noise to the output signal. When the quadrature condition between the output signal beam and the reference beam could be reached (in this case the additional phase shift is zero and the adjustable wave plate is not necessary), the output background level is zero and there is complete elimination of the effect of the laser intensity fluctuations on the output signal.

The embodiment shown in FIG. 2 has also the advantage to minimize by its differential configuration, the spurious background coming from scattering or weak reflections by faces of the real-time holographic element or crystal of the strong pump beam.

Figure 3:
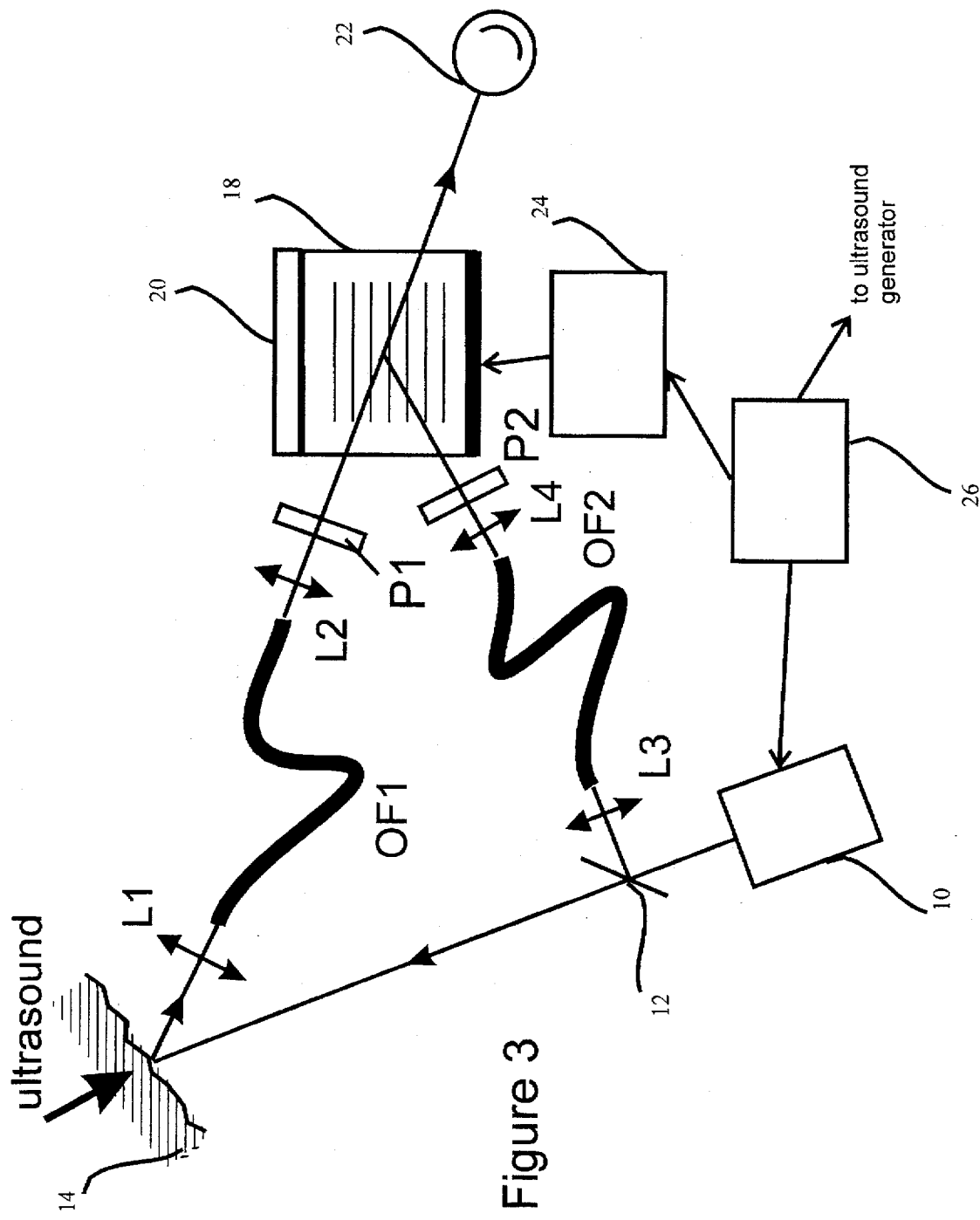
FIG. 3 is a schematic illustration of a third embodiment of an apparatus for optically detecting transient motion from the surface of a workpiece which includes optical fibers providing light paths between elements; and, FIG. 4 is a schematic illustration of a fourth embodiment of an apparatus for optically detecting transient motion from the surface of a workpiece using both polarizations of the signal beam.

FIG. 3 illustrates a third preferred embodiment according to the invention. In this embodiment the real-time holographic element or photorefractive crystal 18 and its associated optics and detectors can be located at a distance from the detection laser by the use of optical fiber links. The first one, which includes large core size multimode fiber OF1, lens L1 to collect the scattered light from the surface and lens L2 to project the signal beam onto the real-time holographic material element or photorefractive crystal 18 has been previously reported and used. A polarizer P1 is used to select the proper polarization for coupling into the real-time holographic element or crystal. The second fiber link for the pump beam is novel. Usually the pump beam is directly derived from the laser and is in good approximation a plane wave. Applicants found that a pump beam coupled through a multimode fiber, thus producing a speckle-like distribution, works also quite well. As seen in FIG. 3, a fraction of the laser light is coupled into fiber OF2 by lens L3. Lens L4 projects transmitted light onto the real-time holographic element or crystal. This light is polarized by polarizer P2. As shown in FIG. 3, a single detector 22 can be used similar to the first described embodiment. It is also possible to use a differential scheme as in the second embodiment. In this case the polarizations chosen and the crystal orientation are those indicated above in relation to this second embodiment.

Figure 4:
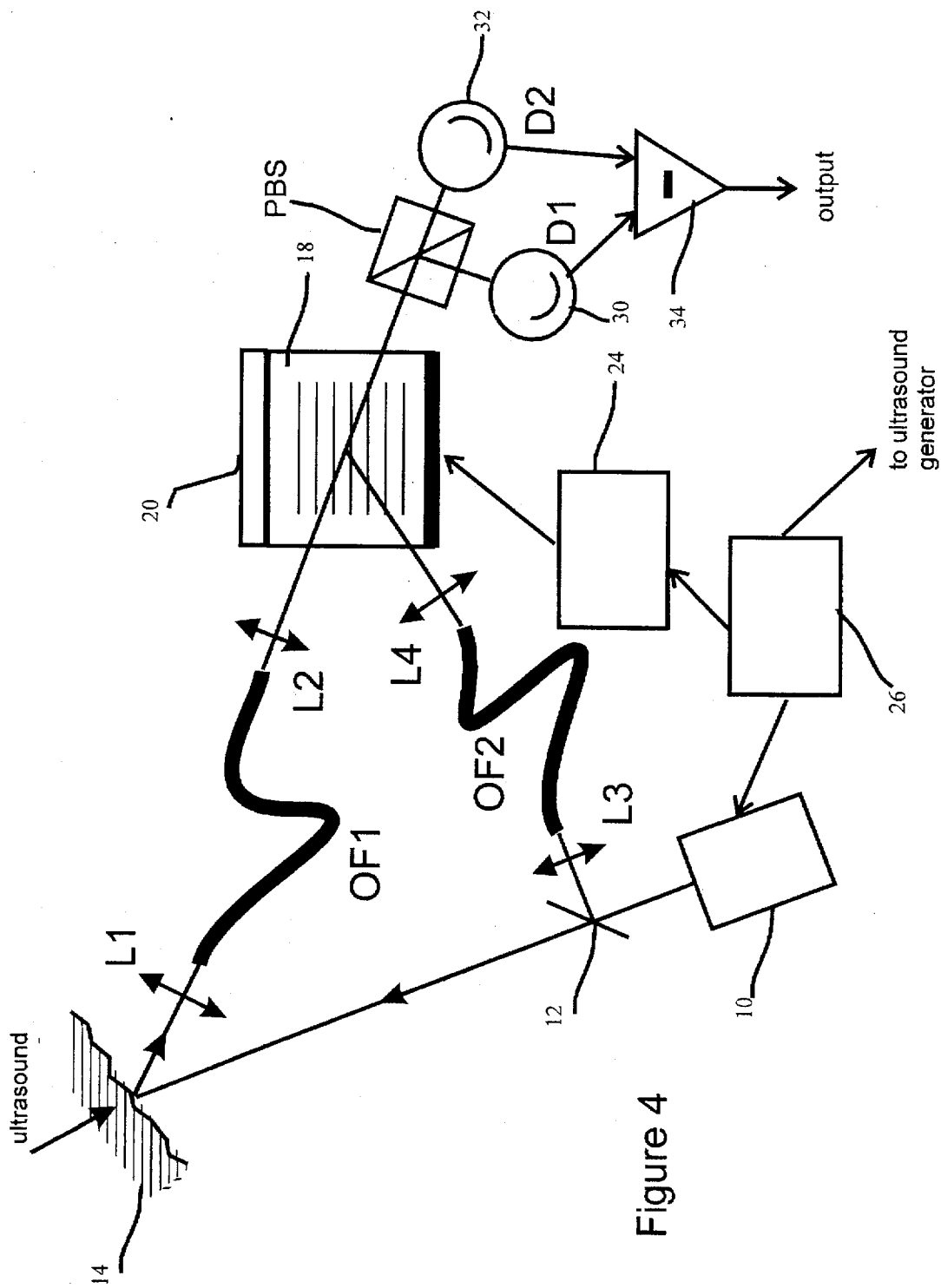

FIG. 4 illustrates a fourth embodiment according to the invention. Unlike the previous embodiments, this embodiment uses both polarizations of the signal beam. The real-time holographic element or crystal 18 has the same orientation as in the second embodiment. The signal and the pump beam are coupled onto the real-time holographic element through optical fibers as in the previous embodiment, but no polarizers are used at the output of the fibers. These fibers are large core multimode fibers giving speckle-like light without any preferential direction of polarization, i.e. unpolarized light. A polarizing beam splitter (PBS) oriented at 45° with respect to the plane of the drawing is used. The two signals after the polarizing beam splitter are collected by two detectors 30 and 32 followed by a differential amplifier 34. The output signal results from contributions of both polarizations of the fibers and since the available light power is used more efficiently an improved sensitivity could result.

More precisely, the operation of the device in this case can be understood as follows. The application of the electric field produces two new neutral axes at 45° with respect to the plane of the drawing. The beams from the signal and pump fibers being unpolarized can be considered as the superposition of two incoherent beams with polarizations along each of the new neutral axes and with approximately the same intensity. These beams give rise to index of refraction gratings, which can be shown to be of opposite signs. Two signals representative of the surface motion with opposite signs are then produced, which add up when the differential configuration shown in FIG. 4 is used. Detailed analysis shows that this embodiment without polarizers shown by FIG. 4 leads to the same sensitivity (same signal-to-noise ratio) as the previous embodiment with polarizers shown in FIG. 3, the following conditions being satisfied: the same electric field is applied in both cases and its magnitude is such to give optimum sensitivity in the case of FIG. 3. When a higher field can be applied depending upon laser repetition rate and response time requirements, a better sensitivity can even be reached. Analysis shows that in this case, the sensitivity can be increased by a factor equal to $\sqrt{2}$ with respect to the third embodiment shown in FIG. 3.

Of course, numerous other embodiments may be envisaged without departing from the spirit and scope of this invention.

What we claim is:

1. A method of optically detecting transient motion from the surface of a workpiece having a predetermined duration, comprising the steps of:

a) directing a beam generated by a laser onto said surface;

b) receiving a light beam that has been reflected or scattered by said surface;

c) allowing the received light beam to interfere with a pump beam removed from the laser, inside a real-time holographic material, so as to form a grating diffracting the pump beam into a reference beam, which interferes at the output of the real-time holographic material with the received light beam, so as to produce a signal representative of the surface transient motion;

d) applying onto said real-time holographic material, an electric field of sufficient magnitude to increase substantially the intensity of said reference beam and to give to this beam a phase differing substantially from the phase of said received light beam, wherein the step of applying the electric field is performed prior to the transient motion to be detected, for a time interval sufficiently long to capture the transient motion but sufficiently short to avoid excessive heating of the real-time holographic material; wherein said pump beam being of sufficiently high intensity to cause the response time of the real-time holographic material to be substantially shorter than a characteristic time defined as the time during which the phase of the received light, on average across its spatial distribution or locally, is not substantially changed; and, e) inducing surface transient motion at a predetermined time after electric field application onto the real-time holographic material, and wherein the pump beam intensity, applied field amplitude and applied field duration are such, as to avoid real-time holographic material catastrophic failure.

2. A method as defined in claim 1, wherein the received light beam is polarized prior to performing step (c).

3. A method as defined in claim 1, wherein the laser is pulsed, with a pulse duration which exceeds the duration of the surface transient motion and exceeds said characteristic time, while being less than the duration of application of the electric field.

4. A method as defined in claim 2, wherein the real-time holographic material is a crystal and is cut and oriented in such a way to ensure the reference beam is polarized perpendicularly to said received light beam.

5. A method as defined in claim 1, wherein the real-time holographic material is a photorefractive material.

6. A method as defined in claim 2, where the pump beam removed from the laser beam is transmitted by an optical fiber and is polarized prior to allowing the received light beam to interfere with a pump beam removed from the laser, inside a real-time holographic material.

7. A method as defined in claim 1, wherein the pump beam removed from the laser beam and the received light beam are both transmitted by optical fibers and are coupled into the real-time holographic material substantially unpolarized.

8. An apparatus for optically detecting transient motion from the surface of a workpiece having a predetermined duration, which comprises:

a) means for inducing said transient motion;

b) means for generating and directing a laser beam onto said surface;

c) means for receiving light reflected or scattered by said surface and phase modulated by its transient motion;

e) real-time holographic material element provided with electrodes and arranged to collect a received light beam;

f) means for removing directly from the laser beam a pump beam of sufficiently high intensity to cause the response time of the real-time holographic material element to be substantially shorter than a characteristic time defined as the time during which the phase of the received light, on average across its spatial distribution or locally, is not substantially changed;

g) means for causing the received light beam to interfere inside the real-time holographic material element with said pump beam, so as to form a grating diffracting said pump beam into a reference beam, which interferes at the output of the real-time holographic material with the received light beam, so as to produce a signal representative of the surface transient motion;

h) means for applying onto said real-time holographic material element electrodes a pulsed electrical voltage of sufficient magnitude to increase substantially said reference beam intensity with a phase also differing substantially from the phase of said transmitted received light beam;

i) means for timing the triggering of the excitation of the transient motion and the application of the electrical voltage, the voltage being turned on before the triggering of said means for inducing transient motion and turned off after end of transient motion, while keeping turn-on duration minimum to avoid heating of the real-time holographic material.

9. An apparatus as defined in claim 8, further including first polarizing means to polarize received light beam before coupling into the real-time holographic material element.

10. An apparatus as defined in claim 8, wherein said means for generating a laser beam is pulsed, with a pulse duration exceeding the duration of the surface transient motion and exceeding said characteristic time, while being less than the duration of application of the electrical voltage, the triggering of the laser pulse being controlled by said timing means.

11. An apparatus as defined in claim 8, wherein the real-time holographic material element is a photorefractive crystal.

12. An apparatus as defined in claim 11, wherein the photorefractive crystal material is a sillenite.

13. An apparatus as defined in claim 11, wherein the photorefractive crystal material is a semiconductor.

14. An apparatus as defined in claim 13, wherein the photorefractive crystal material is doped Indium Phosphide.

15. An apparatus as defined in claim 13, wherein the photorefractive crystal material is doped Cadmium Telluride.

16. An apparatus as defined in claim 8, further including a thermoelectric cooling means upon which is mounted the real-time holographic material element.

17. An apparatus as defined in claim 8, wherein the magnitude of the applied voltage is such that the reference beam is substantially in quadrature with said transmitted received light beam.

18. An apparatus as defined in claim 9, wherein the real-time holographic material element is a crystal and is cut and oriented in such a way to produce said reference beam polarized perpendicularly to said transmitted received light beam, the interference that produces a signal representative of the surface transient motion, described in (g) of claim 8 including a polarizing beam splitter means, for providing two output signal beams.

19. An apparatus as defined in claim 18, further comprising two photodetectors to collect said output signal beams, these photodetectors for providing signals to a differential amplifier means, for providing a signal representative of the surface transient motion with minimum background signal offset and spurious contributions.

20. An apparatus as defined in claim 19, further comprising an adjustable wave plate to maximize the signal representative of surface transient motion at the output of said differential amplifier means.

21. An apparatus as defined in claim 9, further comprising an optical fiber for transmitting said pump beam to the real-time holographic material element and second polarizing means ahead of the real-time holographic material element for providing a same polarization as said first polarizing means.

22. An apparatus as defined in claim 8, further comprising optical fibers for transmitting said pump beam and said received light beam for coupling onto the real-time holographic material element, the outputs of these two fibers ahead of the real-time holographic material element being substantially unpolarized and coupled as such into the real-time holographic material element.

23. An apparatus as defined in claim 22, further comprising polarizing beam splitting means, for providing two output signal beams and two photodetectors to receive these output signal beams, these photodetectors for providing their signals to a differential amplifier means, for providing a signal representative of the surface transient motion.

* * * * *